United States Patent
Koumura

(10) Patent No.: US 7,661,688 B2
(45) Date of Patent: Feb. 16, 2010

(54) DOUBLE-JOINT TYPE SUSPENSION FOR STEERABLE WHEEL

(75) Inventor: Shingo Koumura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 287 days.

(21) Appl. No.: 11/129,365

(22) Filed: May 16, 2005

(65) Prior Publication Data

US 2005/0263973 A1    Dec. 1, 2005

(30) Foreign Application Priority Data

May 31, 2004    (JP)    ............................. 2004-161352

(51) Int. Cl.
*B60G 3/18*    (2006.01)
(52) U.S. Cl. ............................. 280/124.135
(58) Field of Classification Search .. 280/124.134–135, 280/124.143–144, 124.135, 124.144, 124.125
See application file for complete search history.

(56) References Cited

U.S. PATENT DOCUMENTS

| | | | |
|---|---|---|---|
| 1,766,859 A * | 6/1930 | Vincent | ........................ 280/88 |
| 3,988,818 A * | 11/1976 | Allison | .................. 29/898.051 |
| 4,530,514 A | 7/1985 | Ito | |
| 4,603,882 A * | 8/1986 | Kijima et al. | .......... 280/124.128 |
| 4,740,012 A * | 4/1988 | Kondo et al. | .......... 280/124.144 |
| 4,842,296 A | 6/1989 | Kubo | |
| 6,764,084 B1 * | 7/2004 | Nakamura et al. | ..... 280/93.512 |

FOREIGN PATENT DOCUMENTS

| | | |
|---|---|---|
| EP | 0 265 959 A2 | 5/1988 |
| JP | U-60-118504 | 8/1985 |
| JP | A 63-270207 | 11/1988 |
| JP | A-03-153410 | 7/1991 |
| JP | A 4-238707 | 8/1992 |
| JP | A 5-278421 | 10/1993 |
| JP | A 2001-287522 | 10/2001 |

* cited by examiner

*Primary Examiner*—Eric Culbreth
(74) *Attorney, Agent, or Firm*—Oliff & Berridge, PLC

(57) ABSTRACT

A double-joint suspension system for a steerable wheel of a vehicle includes suspension arms connecting a vehicle body and a knuckle arm, consisting of a first suspension arm located approximately in a lateral direction and a second suspension arm in which an angle between a longitudinal axis and the second arm is smaller than an angle between the first arm and the axis, a first elastic member between the body and the first arm, a second elastic member between the body and the second arm a first connecting member rotatably connecting the knuckle and the first arm and a second connecting member rotatably connecting the knuckle and the second arm.

9 Claims, 4 Drawing Sheets

FIG.4
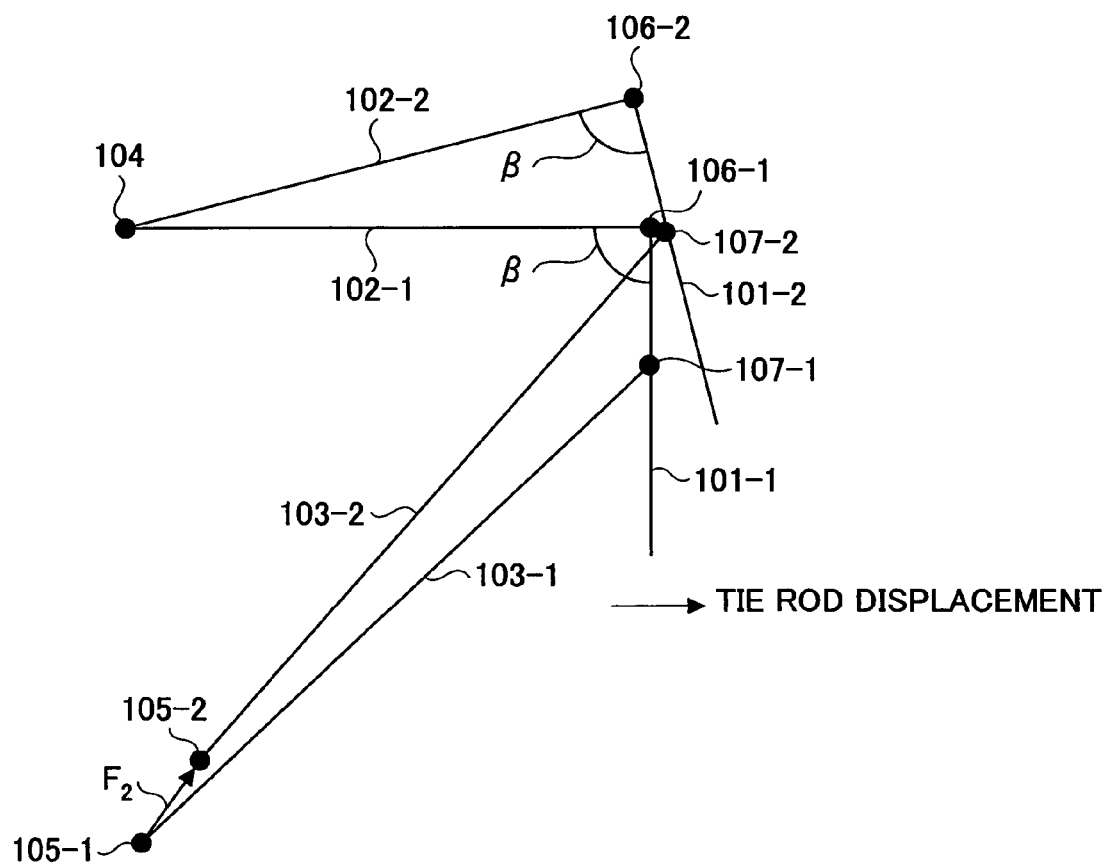

DOUBLE-JOINT TYPE SUSPENSION FOR STEERABLE WHEEL

BACKGROUND OF THE INVENTION

1. Field of the Invention

The present invention relates to a double-joint type suspension system for use with a steerable wheel of a vehicle, and more particularly to a double-joint type suspension system for a steerable wheel in which behavior of an axle in a steered direction at the beginning of steering is made smooth.

2. Description of the Related Art

In the field of a suspension system for a vehicle, as a suspension type for use with a steerable wheel, a so-called double-joint type suspension system is well known, in which two suspension arms are connected to a knuckle arm with two ball joints, respectively.

In the conventional double-joint type suspension system, it has been proposed that an elastic characteristic of a vehicle body side bushing of one suspension arm in which an angle between such suspension arm and a longitudinal axis of the vehicle is smaller than an angle between the other suspension arm and the longitudinal axis be made nonlinear in order to reduce a drag on steering. See, for example, JP4-238707A.

In the typical double-joint type suspension system, the ball joints connecting the suspension arms and the knuckle arm are configured to have some friction torques (friction drags) in order to provide a response (i.e. reaction force) to a driver when steering. However, if such friction torques of the ball joints are excessive, then those act as drags on steering when the driver steers, especially at the beginning of steering.

In the conventional double-joint type suspension system, because no attention is paid to such drags on steering generated in wheel side ball joints of the suspension arms and therefore those are not adequately reduced, those may give to the driver of the vehicle the impression that smoothness of the behavior of the axle in the steered direction is not enough, especially at the beginning of steering.

SUMMARY OF THE INVENTION

To solve the above-mentioned problems, it is a main object of this invention to provide a double-joint type suspension system for a steerable wheel of which behavior of an axle in a steered direction, especially at the beginning of steering, is made smooth.

One aspect of this invention to achieve the above object is a double-joint type suspension system for use with a steerable wheel of a vehicle, including: suspension arms configured to connect a vehicle body and a knuckle arm; elastic members (e.g. bushings) configured to be provided between the vehicle body and the suspension arms; and connecting members (e.g. ball joints) configured to rotatably connect the knuckle arm and the suspension arms, friction torques of the connecting members being set in accordance with rigidities of the elastic members.

In the context of this aspect, the suspension arms may consist of a first suspension arm and a second suspension arm, the first suspension arm being located approximately in a lateral direction of the vehicle, an angle between the second suspension arm and a longitudinal axis of the vehicle being smaller than an angle between the first suspension arm and the longitudinal axis; the elastic members may consist of a first elastic member and a second elastic member, the first elastic member being provided between the vehicle body and the first suspension arm, the second elastic member being provided between the vehicle body and the second suspension arm; the connecting members consist of a first connecting member and a second connecting member, the first connecting member rotatably connecting the knuckle arm and the first suspension arm, the second connecting member rotatably connecting the knuckle arm and the second suspension arm; and the friction torque of the first connecting member may be made larger than the friction torque of the second connecting member when the rigidity of the first elastic member is greater than the rigidity of the second elastic member.

According to this aspect, the drags on steering generated in the connecting members between the suspension arms and the knuckle arm are effectively reduced so that the behavior of the axle in the steered direction is made smooth, especially at the beginning of steering, thereby improving behavior of the vehicle.

BRIEF DESCRIPTION OF THE DRAWINGS

These and other objects, features, and advantages of the present invention will become more apparent upon reading the following detailed description with reference to the accompanying drawings, in which:

FIG. 4 is a figure describing the arms and the joints of FIG. 2 with lines and dots, respectively, in a case where the friction torque of the front side ball joint is made larger.

DETAILED DESCRIPTION OF THE PREFERRED EMBODIMENTS

A preferred embodiment of the present invention is now described with reference to the appended drawings. In this embodiment, a double-joint type suspension structure is illustrated as an example of the double-joint type suspension system for the steerable wheel. Note that the basic structure and functions of the double-joint type suspension system are not described in detail in the following description because such matters are known to the person skilled in the art.

Figure 1:
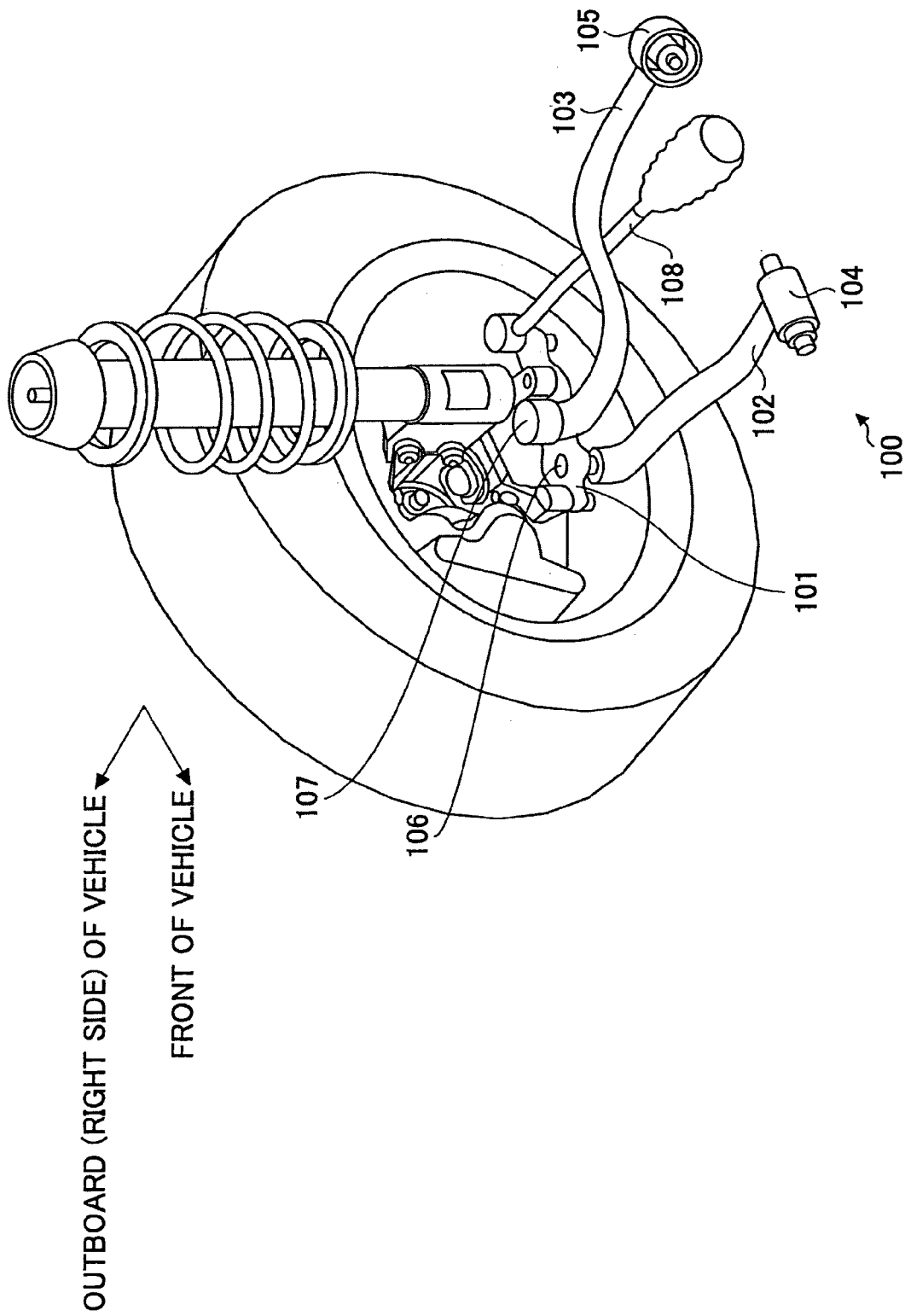
FIG. 1 is a schematic view showing the structure of a double-joint type suspension system according to an embodiment of this invention.

FIG. 1 schematically shows the structure of a double-joint type suspension system 100 according to this embodiment. It is assumed in this embodiment that front wheels are steerable. For the sake of simplicity, only a right front wheel is shown in FIG. 1.

Since the double-joint type suspension system 100 employs the double-joint type suspension structure, a knuckle arm 101 is attached to a vehicle body (not shown) with two arms: a first suspension arm 102 and a second suspension arm 103, as is known to the person skilled in the art.

Figure 2:
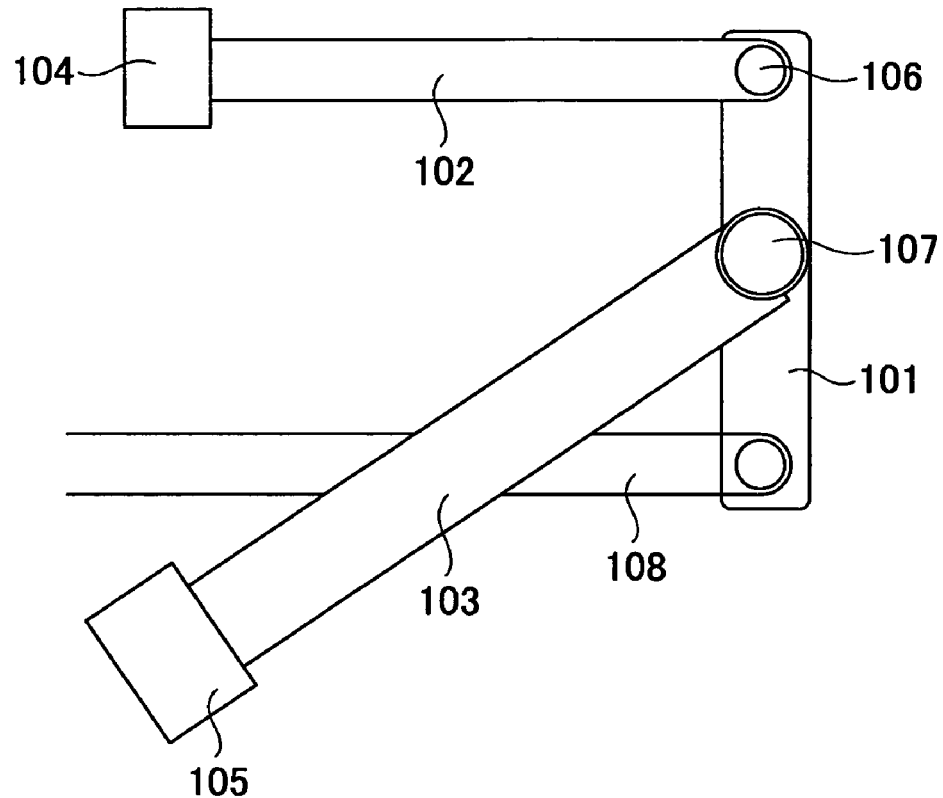
FIG. 2 is a top view showing the physical relationship between suspension arms and a knuckle arm of a double-joint type suspension system according to an embodiment of this invention.

In such a structure, the first suspension arm 102, which is located at a front side of the second suspension arm 103 in the longitudinal direction of the vehicle, extends approximately in a lateral direction of the vehicle, and acts to support the suspension system 100 when lateral force is applied to the suspension system 100. The second suspension arm 103, which is located at a rear side of the first suspension arm 102 in the longitudinal direction of the vehicle, has a smaller angle between the second suspension arm 103 and a longitudinal axis of the vehicle than an angle between the first suspension arm 102 and the longitudinal axis, as shown in FIG. 2, and acts to support the suspension system 100 when longitudinal force is applied to the suspension system 100. lateral force is applied to the suspension system 100. The second suspension arm 103, which is located at a rear side of the first suspension arm 102 in the longitudinal direction of the vehicle, has a smaller angle between the second suspension arm 103 and a longitudinal axis of the vehicle than an angle between the first suspension arm 102 and the longitudinal axis, as shown in FIG. 2. and acts to support the suspension system 100 when longitudinal force is applied to the suspension system 100.

Vehicle body side ends of the first and second suspension arms 102 and 103 are fixed to the vehicle body through bushings 104 and 105, respectively, each of which is an elastic member.

Since the first suspension arm 102 has to bear the lateral force, as described above, a bushing having relatively high rigidity (e.g. 20,000 N/mm) is normally employed for the bushing 104. On the other hand, since the second suspension arm 103 has to flexibly treat the longitudinal force, a bushing having relatively low rigidity (e.g. 1,000-2,000 N/mm) is normally employed for the bushing 105.

Wheel side ends of the first and second suspension arms 102 and 103 are fixed to the knuckle arm 101 through ball joints 106 and 107, respectively, each of which is a connecting member able to rotatably connect two parts.

By the way, the magnitude of the friction torque (friction drag) required to rotate a ball joint can be adjusted by, for example, selecting the viscosity of grease. In other words, one may increase the friction torque of the ball joint in order to allow it to be difficult to rotate, or decrease the friction torque of the ball joint in order to allow it to be easy to rotate.

In the conventional double-joint type suspension system, because no attention is paid to the rigidities of the two ball joints connecting the suspension arms and the knuckle arm (or the difference of their rigidities), as described above, it is normal to employ the same ball joints for them in order to reduce the number of part types used. In other words, in the conventional double-joint type suspension system, it is normal that there is little difference of the rigidities of two ball joints used.

In contrast, in this embodiment, the magnitudes of the friction torques (friction drags) of the bushings 104 and 105 and/or the difference of their friction torques are adjusted in accordance with the rigidities of the bushings 104 and 105 and/or the difference of their rigidities. This is now explained in detail with reference to FIGS. 2-4.

Figure 3:
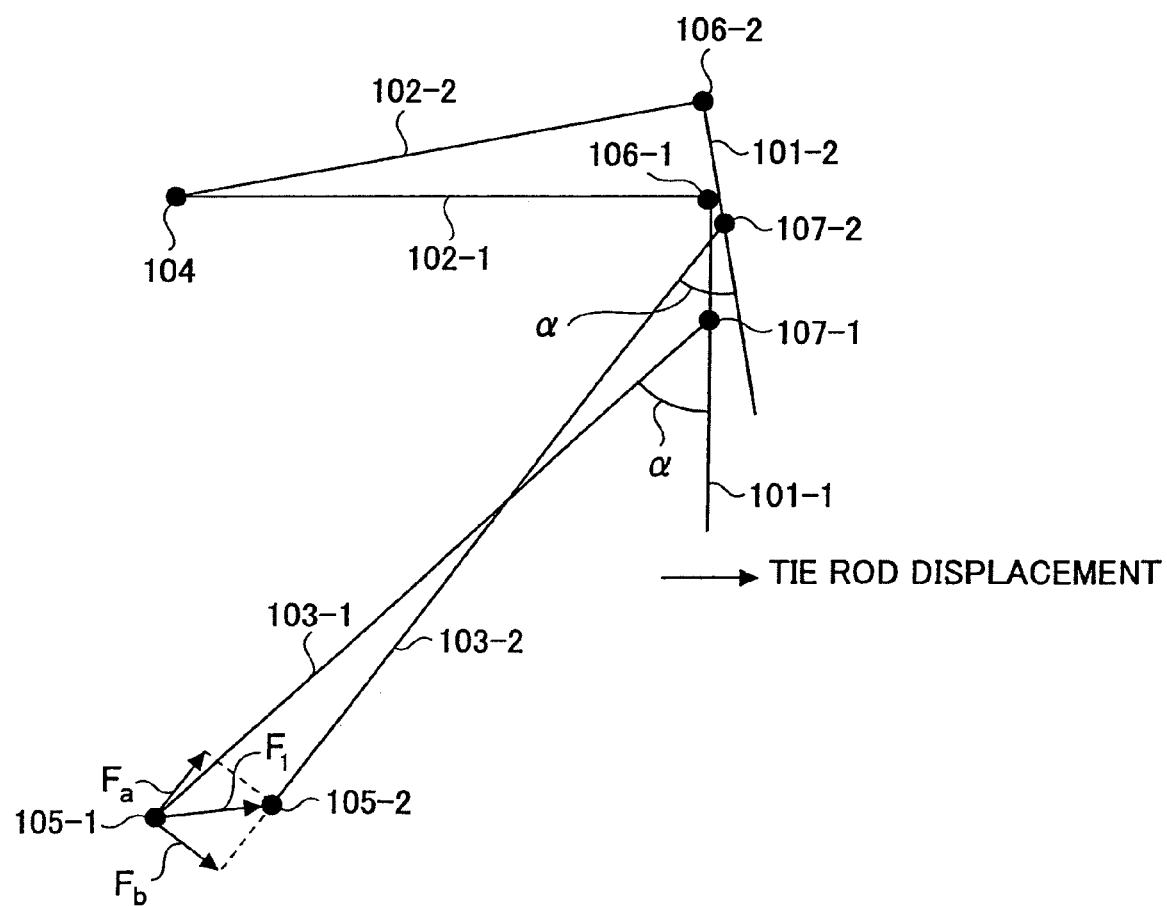
FIG. 3 is a figure describing the arms and the joints of FIG. 2 with lines and dots, respectively, in a case where the friction torque of the rear side ball joint is made larger.

FIG. 2 is a top view showing the physical relationship between the suspension arms 102 and 103 and the knuckle arm 101 of the double-joint type suspension system 100 according to this embodiment. FIGS. 3 and 4 describe the arms and the joints with lines and dots, respectively.

As described above, in a typical vehicle, the rigidity of the bushing 104 is higher than the rigidity of the bushing 105 by 10-20 times. Therefore, it is predicted that when a tie rod 108 is displaced in the lateral direction and thereby the knuckle arm 101 is moved, an elastic deformation is caused hardly in the bushing 104, but mostly in the bushing 105, even if at least one of the ball joints 106 and 107 is locked.

In terms of the friction torques of the ball joints 106 and 107, in a case where the friction torque of the ball joint 106 located at the front side for connecting the first suspension arm 102 and the knuckle arm 101 is smaller than the friction torque of the ball joint 107 located at the rear side for connecting the second suspension arm 103 and the knuckle arm 101 due to, for example, intentions or individual differences or variations over time, resulting changes to the bushing 105 are shown in FIG. 3.

When the driver of the vehicle turns a steering handle (not shown) to the left, the tie rod 108 is caused to move to the right and the knuckle arm 101 is then moved from Position 101-1 to Position 101-2. Consequently, the first suspension arm 102 is moved from Position 102-1 to Position 102-2, and the second suspension arm 103 is moved from Position 103-1 to Position 103-2.

During such turning, it can be taken that an angle a between the knuckle arm 101 and the second suspension arm 103 is approximately constant before and after the displacement of the tie rod 108. This leads to the elastic deformation of the bushing 105 from Position 105-1 to Position 105-2. In other words, a load $F_1$ is applied to the bushing 105, which load causes the elastic deformation of the bushing 105 from Position 105-1 to Position 105-2.

As shown in FIG. 3, the load $F_1$ is resolved into a vector $F_a$ that is parallel to an axial direction of the suspension arm 103 and a vector $F_b$ that is orthogonal to the axial direction of the suspension arm 103. Since in the nature of the bushing 105, the bushing 105 is flexible in the direction parallel to the axis of the suspension arm 103, but rigid in the direction orthogonal to the axis of the suspension arm 103, the load $F_1$ causes a large drag on steering, especially at the beginning of steering, due to such orthogonal component $F_b$ included in the load $F_1$.

In other words, in a case where the friction torque of the ball joint 107 is larger than the friction torque of the ball joint 106 as in FIG. 3, a large steering force is required at the beginning of steering.

In this embodiment, the friction torque of the ball joint 106 is intentionally, i.e. actively, made larger than the friction torque of the ball joint 107 in advance by, for example, using different types of grease. Resulting changes to the bushing 105 in this case are shown in FIG. 4.

As in the case of FIG. 3, when the driver of the vehicle turns a steering handle (not shown) to the left, the tie rod 108 is caused to move to the right and the knuckle arm 101 is then moved from Position 101-1 to Position 101-2. Consequently, the first suspension arm 102 is moved from Position 102-1 to Position 102-2, and the second suspension arm 103 is moved from Position 103-1 to Position 103-2.

During such turning, it can be taken that an angle β between the knuckle arm 101 and the first suspension arm 102 is approximately constant before and after the displacement of the tie rod 108. This leads to the elastic deformation of the bushing 105 from Position 105-1 to Position 105-2. In other words, a load $F_2$ is applied to the bushing 105, which load causes the elastic deformation of the bushing 105 from Position 105-1 to Position 105-2.

Since the load $F_2$ is approximately a vector that is parallel to the axial direction of the suspension arm 103 and includes little vector component that is orthogonal to the axial direction of the suspension arm 103, as shown in FIG. 4, it hardly increases the drag on steering, unlike with the load $F_1$ in FIG. 3. Accordingly, in this embodiment, a large steering force is not required at the beginning of steering; thereby the behavior of the axle in the steered direction is made smooth.

In addition, the inventor of the present invention has acquired knowledge that the friction torque of the front side ball joint 106 is to be made larger than the friction torque of the rear side ball joint 107, preferably by twice or more times, and more preferably approximately by 4 times.

Thus, according to this embodiment, in the double-joint type suspension system, the friction torque of the ball joint at the wheel side end of the suspension arm, of which the vehicle body side end is provided with a bushing having relatively high rigidity, which arm is oriented in the lateral direction of the vehicle for bearing the lateral force applied to the suspension system, is made larger than the friction torque of the ball joint at the wheel side end of the suspension arm, of which the vehicle body side end is provided with a bushing having relatively low rigidity by, for example, selecting the grease, so that it is possible to prevent the drag on steering at the beginning of steering from increasing, thereby the behavior of the axle in the steered direction is made smooth.

By the way, in the above embodiment, by way of example, an illustrative case is described where the first suspension arm 102 extending approximately in the lateral direction of the vehicle is located at the front side of the second suspension arm 103 in the longitudinal direction of the vehicle; the second suspension arm 103 having a smaller angle between the second suspension arm 103 and the longitudinal axis of the vehicle than an angle between the first suspension arm 102 and the longitudinal axis is located at the rear side of the first suspension arm 102 in the longitudinal direction of the vehicle; and, consequently the ball joint 106 connecting the first suspension arm 102 and the knuckle arm 101 is located before the ball joint 107 connecting the second suspension arm 103 and the knuckle arm 101 in the longitudinal direction. However, the present invention is not limited to this and a case where the physical relationship in the longitudinal direction between the suspension arms is reversed is also within the scope of the present invention.

Also, in the above embodiment, by way of example, an illustrative case is described where the suspension arms are fixed to the vehicle body through the bushings and connected to the knuckle arm through the ball joints. However, the present invention is not limited to this and a case where elastic members other than the bushings are provided between the suspension arms and the vehicle body and/or connecting members other than the ball joints are provided between the suspension arms and the knuckle arm is also within the scope of the present invention, as long as any structure in which ease (or difficulty) of the elastic deformation between the vehicle body and the suspension arms and ease (or difficulty) to rotate between the suspension arms and the knuckle are adjustable is employed.

The present invention is applicable to any double-joint type suspension system for use with a steerable wheel of a vehicle. The present invention does not depend on visual design, weight, size, or performance of driving of the vehicle on which the double-joint type suspension system of the present invention is employed.

The contents of Japanese Patent Application No. JP2004-161352 filed on May 31, 2004 including the specification, drawings, and abstract are incorporated herein by reference in its entirety.

What is claimed is:

1. A double-joint suspension system for use with a steerable wheel of a vehicle, comprising:
   suspension arms configured to connect a vehicle body and a single knuckle arm;
   elastic members configured to be provided between the vehicle body and the suspension arms, the elastic members comprising first and second elastic members; and
   connecting members configured to rotatably connect the knuckle arm and the suspension arms, wherein
   a first connecting member from amongst the connecting members includes a different grease than a second connecting member so that a friction torque of the first connecting member is substantially larger than a friction torque of the second connecting member from amongst the connecting members, and
   the rigidity of the first elastic member is greater than the rigidity of the second elastic member.

2. The double-joint suspension system as claimed in claim 1, wherein:
   the suspension arms comprise a first suspension arm and a second suspension arm, the first suspension arm being located approximately in a lateral direction of the vehicle, an angle between the second suspension arm and a longitudinal axis of the vehicle being smaller than an angle between the first suspension arm and the longitudinal axis;
   the first elastic member is provided between the vehicle body and the first suspension arm, and the second elastic member is provided between the vehicle body and the second suspension arm; and
   the first connecting member rotatably connects the knuckle arm and the first suspension arm, and the second connecting member rotatably connects the knuckle arm and the second suspension arm.

3. The double-joint suspension system as claimed in claim 2, wherein the friction torque of the first connecting member from amongst the connecting members is at least twice as large as the friction torque of the second connecting member from amongst the connecting members.

4. The double-joint suspension system as claimed in claim 2, wherein the friction torque of the first connecting member from amongst the connecting members is at least four times as large as the friction torque of the second connecting member from amongst the connecting members.

5. The double-joint suspension system as claimed in claim 1, wherein:
   each of the elastic members is a bushing; and
   each of the connecting members is a ball joint.

6. The double-joint suspension system as claimed in claim 1, wherein the friction torque of the first connecting member from amongst the connecting members is at least twice as large as the friction torque of the second connecting member from amongst the connecting members.

7. The double-joint suspension system as claimed in claim 1, wherein the friction torque of the first connecting member from amongst the connecting members is at least four times as large as the friction torque of the second connecting member from amongst the connecting members.

8. The double-joint suspension system as claimed in claim 1, wherein the rigidity of the first elastic member is about 20,000 N/mm and the rigidity of the second elastic member is between about 1,000 to 2,000 N/mm.

9. The double-joint suspension system as claimed in claim 1, wherein the different grease included in the first connecting member has a substantially different viscosity than a grease included in the second connecting member.

* * * * *

UNITED STATES PATENT AND TRADEMARK OFFICE
CERTIFICATE OF CORRECTION

| | | |
|---|---|---|
| PATENT NO. | : 7,661,688 B2 | Page 1 of 1 |
| APPLICATION NO. | : 11/129365 | |
| DATED | : February 16, 2010 | |
| INVENTOR(S) | : Shingo Koumura | |

It is certified that error appears in the above-identified patent and that said Letters Patent is hereby corrected as shown below:

Title Page Item (54) and Col. 1,

Title, replace "DOUBLE-JOINT TYPE SUSPENSION FOR STEERABLE WHEEL" with --DOUBLE-JOINT TYPE SUSPENSION SYSTEM FOR STEERABLE WHEEL--.

Signed and Sealed this

First Day of June, 2010

David J. Kappos
*Director of the United States Patent and Trademark Office*